United States Patent [19]

Ito et al.

[11] 4,165,929

[45] Aug. 28, 1979

[54] CAMERA WITH EXPOSURE CONTROL DEVICE

[75] Inventors: Fumio Ito, Yokohama; Yukio Mashimo, Tokyo; Masayoshi Yamamichi, Kawasaki; Masami Shimizu; Hiroyashu Murakami, both of Tokyo; Tadashi Ito, Yokohama, all of Japan

[73] Assignee: Canon Kabushiki Kaisha, Tokyo, Japan

[21] Appl. No.: 859,694

[22] Filed: Dec. 12, 1977

[30] Foreign Application Priority Data

Nov. 30, 1974 [JP] Japan ............................ 49/138688
Dec. 5, 1974 [JP] Japan ............................ 49/140183

[51] Int. Cl.² ............................................. G03B 7/08
[52] U.S. Cl. ...................................... 354/38; 354/26; 354/29; 354/36

[58] Field of Search ................. 354/26, 28, 29, 36, 354/37, 38

[56] References Cited

U.S. PATENT DOCUMENTS 3,829,867  8/1974  Ono ....................................... 354/28

FOREIGN PATENT DOCUMENTS 2434152  2/1975  Fed. Rep. of Germany ........ 354/23 D Primary Examiner—Russell E. Adams
Attorney, Agent, or Firm—Toren, McGeady and Stanger

[57] ABSTRACT

An automatic camera being simple in handling and composition and provided with an accessory selectively mounted on the camera body or with an aperture value setting information device mounted on the camera body, so that the camera operation may select either the shutter time priority mode or the aperture value priority mode.

21 Claims, 9 Drawing Figures

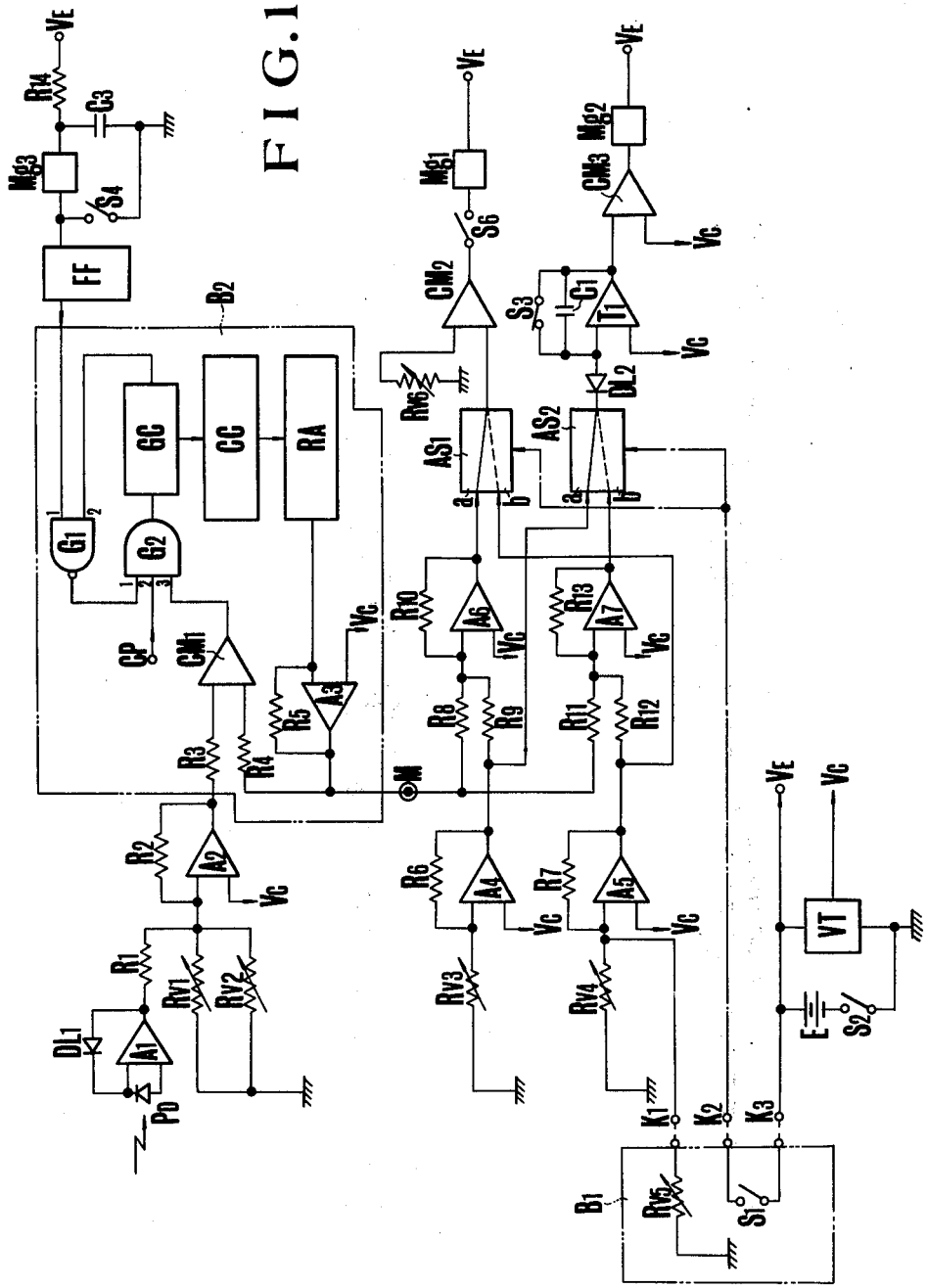
F I G. 1

CAMERA WITH EXPOSURE CONTROL DEVICE

This is a continuation of application Ser. No. 633,713, filed Nov. 20, 1975, now abandoned.

DETAILED EXPLANATION OF THE INVENTION

The present invention relates to a camera particularly a camera with an exposure control device which operates in accordance with a set value whereby either the shutter time or the diaphragm value, can be set with priority.

Various kinds of cameras, for example, single lens reflex cameras with automatic exposure control devices having priority on shutter time are produced, wherein by means of an operation device provided in the camera body an aperture value for the proper exposure can be calculated from the measured value of the brightness of an object to be photographed or from other photographic information. Because this kind of camera adapts the system with priority on shutter time it is impossible to take a picture with the automatic exposure control device set to the automatic exposure control mode and simultaneously either select the focal depth or make an exposure under conditions out of the range of the automatic diaphragm at the time of taking a photograph, whereby it is necessary to change the mode over to the manual photography. Hereby in order to eliminate the above mentioned difficulties of cameras with priority on shutter time, it is proposed to provide a control mode selection means for correcting the preset shutter time to the value satisfying the proper exposure conditions in accordance with the aperture value decided by the automatic diaphragm device in the camera body.

However, when the exposure control device with priority on the aperture value is built into the camera with priority on shutter time, not only the composition but also the handling becomes complicated, whereby especially in case of the camera with an automatic exposure control device by means of which the exposure value is automatically adjusted and controlled it is necessary to selectively and surely carry out the change-over operation of the parts to be made effective and the parts to be made ineffective at the time of the change-over operation of the shutter time priority mode and the aperture value priority mode so that it is inevitable that the change over operation and the composition of the device become complicated, with the result that it is difficult to build the exposure control device into the camera with priority on shutter time.

The principal purpose of the present invention is to offer a camera being simple in handling and composition and capable of photographic operation selecting either the shutter time priority mode or the aperture value priority mode, eliminating the above mentioned shortcomings.

Another purpose of the present invention is to offer a camera capable of photographic operation selecting either the shutter time priority mode or the aperture value priority mode, whereby if the shutter time priority mode is selected the set aperture value is readjusted, the aperture value appointed with priority being taken in consideration.

Further purposes of the present invention will be disclosed in the following detailed explanation to be made in accordance with the accompanying drawings.

BRIEF EXPLANATION OF THE DRAWINGS

FIG. 1 shows an embodiment of the electrical circuit applied to a single reflex camera in accordance with the present invention.

FIG. 4 shows an exploded view of the aperture value priority setting part made as unit.

DESCRIPTION OF THE PREFERRED EMBODIMENTS

Next, the present invention will be explained in accordance with the embodiments shown in the accompanying drawings.

Figure 3:
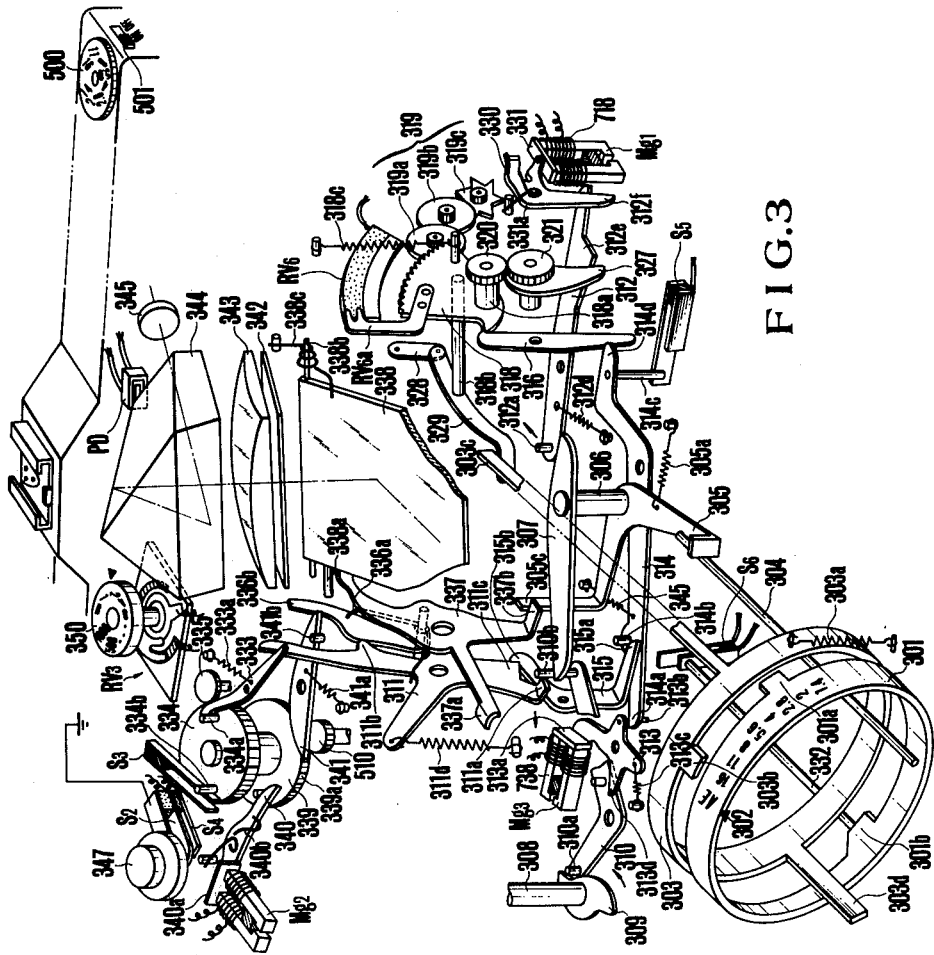
FIG. 3 shows a concrete composition of a single lens reflex camera to be used with the electric circuit shown in FIG. 1 or FIG. 2.

FIG. 1 shows the circuit diagram of the exposure control circuit to be built in the single reflex camera shown in FIG. 3. In the drawing, the light beam coming from an object to be photographed through a photographic lens, not shown in the drawing, reaches the view finder optical system (FIG. 3), so as to be converted into electrical signal by means of the light sensing element PD arranged in the view finder optical system. As a light sensing element PD, for example, a silicone photodiode is used. The output of the light sensing element PD is logarithmically compressed by means of an operational amplifier $A_1$ having a diode $DL_1$ with logarithmic characteristics in the feed back circuit, and is conducted to the second operational amplifier $A_2$ through the resistance $R_1$. Suppose that the brightness of the object to be photographed is Bv, the brightness of the photographic lens, namely the totally opened aperture value information Avo and the totally opened aperture value compensating information for compensating the light amount decreased, for example, vignetting in case the photographic lens, presents a large totally opened aperture value Avc. The input signal to the amplifier $A_2$ is represented as follows. (Brightness of the object Bv)—(Totally opened aperture value of the photographic lens Avo)—(Totally opened aperture value compensating information Avc), while to the amplifier $A_2$ the film sensitivity information Sv is supplied from the variable resistance $Rv_1$ and the totally opened aperture value information is supplied from the variable resistance $Rv_2$, so as to carry out the operation. At the output terminal of the amplifier $A_2$ a signal $-(Bv+Sv-Avo) = -(Ev-Avo)$ is produced. Hereby the variable resistance $Rv_2$ is automatically adjusted by means of the signal member provided at the side of the photographic lens when the photographic lens is mounted on the camera body. The above mentioned signal is put in the comparater CM$_1$ through the resistance, while the output of the comparater CM$_1$ is applied to the input terminal 3 of the AND gate G$_2$. B$_2$ shown in the dotted line in the drawing is a digital memory device. To the connecting point of the resistance R$_{14}$ and the capacitor C$_3$, connected in series between the current source terminal VE and the ground terminal shown at the upper and right part in the drawing, is connected a magnet Mg$_3$ to be supplied with current by the closing operation of the starting switch S$_4$, whereby when current is supplied to Mg$_3$ the switching on signal is produced at the output terminal of the Flip-Flop FF and applied to the input terminal 1 of the NAND gate G$_1$. The output of the NAND gate G$_1$ is applied to the AND gate G$_2$, while to the input terminal 2 of the AND gate a clock pulse CP is applied. The digital memory device B$_2$ presents a D-A converting device containing a gate control circuit Gc to be controlled by the output of the gate C$_2$, a counter to be controlled by the output of the gate control circuit Gc and an adder resistance circuit network RA, whereby the output of the resistance circuit network RA is applied to the other input terminal of the above mentioned comparator CM$_1$ by the resistance R$_4$ through the operation amplifier A$_3$, so as to be compared with the signal containing the measured light value applied to the comparater CM$_1$ through the above mentioned resistance R$_3$. Between the gate control circuit Gc and the terminal 2 of the gate G$_1$ at the end of one cycle the control completion signal of the circuit Gc is produced, whereby at the output terminal M of the amplifier A$_3$ a signal corresponding to $\{-(Ev-Avo)\}$ is produced and conducted to the comparater CM$_1$. The output of the NAND gate G$_1$, of the output of the gate control circuit Gc and of the output of the Flip-Flop FF interrupts the transit of the clock pulse CP to be applied to the terminal 2 of the gate G$_2$, together with the output of the comparater CM$_1$, so that the counter is kept in the determined state. Namely, at the terminal M a signal $\{-(Ev-Avo)\}$ corresponding to the brightness of the object to be photographed before the mirror is raised is produced.

In order to determine the aperture value by means of this memory output in the shutter time priority mode the preset shutter time information $-Tv$ is manually set on the variable resistance Rv$_3$. This information $-Tv$ is inverted by the inversion amplifier A$_4$ into Tv which is put in the operational amplifier A$_6$ through the resistance R$_9$, R$_8$ together with the output of the amplifier A$_3$, namely the memory output produced at the terminal M, whereby the signal $(Ev-Avo-Tv=Av-Avo)$ is obtained at the output terminal of the amplifier A$_6$. This signal is conducted to one input terminal of the comparator CM$_2$ through the analogue switch AS$_1$ so as to be compared with the aperture value information set on the variable resistance Rv$_6$, functionally engaged with the aperture value preset pin, and conducted to the other input terminal in such a manner that the aperture value preset pin is controlled by the effect of Mg$_2$ controlled by the output of the comparator CM$_1$, and thus the aperture value is determined. Namely, on the variable resistance aperture value preset information corresponding to the output signal $Av-Avo$ from the terminal 3 is set. The output Tv of the amplifier A$_4$ is applied to the operational amplifier T$_1$ by means of the logarithm diode DL$_2$ through the analogue switch AS$_2$. The amplifier T$_1$ presents the time count start switch S$_3$, functionally engaged with the start of the front shutter plane, and the capaciter C$_1$ of the timing circuit in its feed back circuit, whereby when the switch S$_3$ is opened the time counting is started and after the elapse of a certain determined time an output is applied to the comparator CM$_3$, by means of which output the magnet Mg$_2$ for controlling the rear shutter plane is actuated so as to allow the rear shutter plane to start to run and complete the exposure. Further the analogue switches AS$_1$ and AS$_2$ consist of conventional selecting switches for selecting either the output a or the output b, whereby in the actual case a relay or a contactless transister change-over circuit is used in such a manner that by means of the aperture value priority signal, to be explained later, the terminal "a" normally connected is changed over to the terminal "b".

So far, the operation of the electrical shutter camera having a digital memory system has been outlined. Next, the aperture-value priority-mode-appointing-part B$_1$ composing the substantial part of the present invention and the internal mechanism of the camera connected thereto will be explained, whereby the part B$_1$ in the drawing can either be built in the camera as one body or made as one accessary unit as shown in FIG. 4, so as to be mounted on the camera body, so that in the drawing the part B$_1$ is shown in the dotted line. As is shown in the dotted line in the drawing, the analogue switches AS$_1$ and AS$_2$ are changed over from the terminal a to the terminal b by the switching-on signal (when the switch S$_1$ is closed) of the change-over switch S$_1$ in the aperture-value-priority-mode-appointing-part B$_1$. Thus, when the switch S$_1$ of the aperture-value-priority-mode-appointing-part B$_1$ is closed while the determined aperture value is set by means of the variable resistance Rv$_5$ the analogue switches AS$_1$ and AS$_2$ are closed in the direction shown in the dotted line in the drawing in the closed state of the switch S$_1$ in such a manner that the totally opened aperture value Avo set on the variable resistance Rv$_4$ and the aperture value preset information $-Av$ set on the variable resistance Rv$_5$ in the accessary B$_1$ are applied to the comparator CM$_2$ from the terminal b of the analogue switch AS$_1$ through the amplifier A$_5$. Further, the signal $Av-Avo$ and the memory output $-(Ev-Avo)$ are applied to the amplifier A$_7$ respectively through the resistances R$_{12}$ and R$_{11}$ so as to produce $Tv=Ev-Avo-(Av-Avo)$ at the output terminal of the amplifier A$_7$, which output is applied to the shutter time control circuit through the terminal b of the analogue switch AS$_2$ so as to control the shutter time. In this way, the photography with priority on aperture value is carried out by the aperture value preset in the aperture priority-mode-appointing-part B$_1$.

Hereby it is possible to preset the aperture value manually without using the appointing part B$_1$, when the switch S$_6$, functionally engaged with the aperture ring of the photographic lens to be explained later, is opened, because no control signal is led to the aperture determining magnet Mg$_1$.

The current source device of the present device consists of a current source E, the current source switch S$_2$ and the standard voltage source VT, whereby the standard voltage produced at the output terminal of the source VT is applied to each amplifier as is shown in the drawing.

Figure 2:
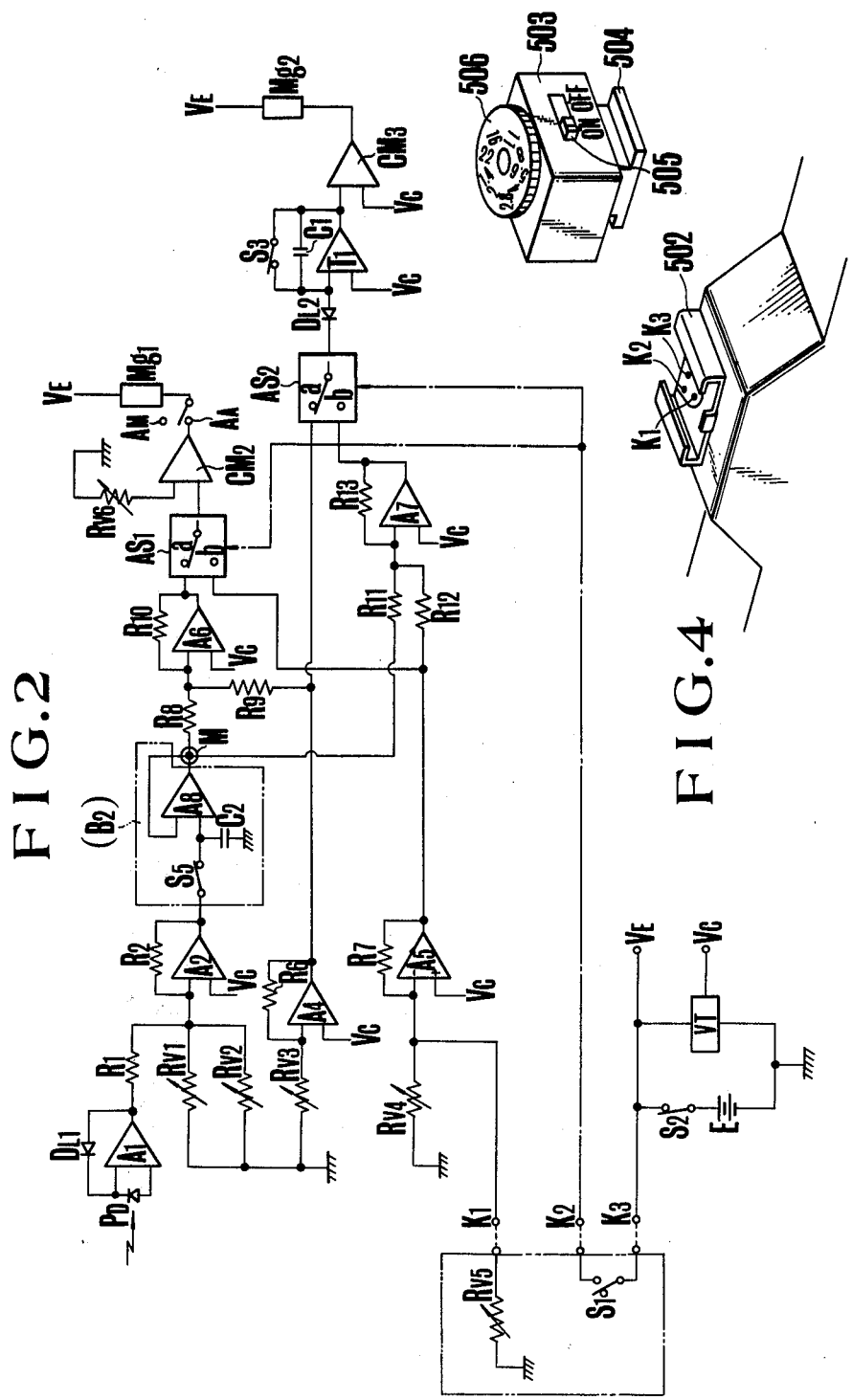
FIG. 2 shows a variation of the embodiment shown in FIG. 1.

FIG. 2 shows the digital memory circuit B$_2$ in the device in FIG. 1 replaced by the ordinary analogue circuit, namely the circuit consisting of the memory switch S$_5$ functionally engaged with the automatic aperture value presetting or the mirror lifting, the memory condenser $C_2$ and the voltage follower with high impedance $A_8$, whereby the elements having the same symbols as those in FIG. 1 correspond to the same elements in FIG. 1, so that their explanations are omitted here. Thus, when the switch $S_1$ of the appointing part $B_1$ is opened while the desired aperture value is set by means of the variable resistance $Rv_5$, it is possible, in accordance with the camera system of the present invention, to change the control mode of camera into aperture value priority mode by the aperture value preset resistance $Rv_5$ in the aperture-value-priority-mode-appointing-part $B_1$ regardless of the value set by the shutter dial, namely the value set by the variable resistance $Rv_3$.

FIG. 3 shows the important composition of the interior mechanism of the camera to be used with the electrical circuit shown in FIG. 1 or FIG. 2, in the wound up state of film or in the charged up state of the shutter. 301 is the aperture ring, on which an automatic aperture value index AE and a manual aperture value index are provided together with the projection 301a and the cam part 301b. 302 is the index for bringing the automatic aperture value index AE in alignment with the manual aperture value index. 303 is the aperture value preset ring being energized clockwise by means of a spring 303a and presenting a projection 303b to be engaged with the projection 301a of the above mentioned aperture ring 301. Further, on the aperture preset ring 303 an arm 303c is provided and serves to determine the amount of rotation of the bell crank by means of a lever 303d provided thereon through the aperture value setting cam ring, not shown in the drawing, whereby the bell crank serves to determine the opening extent of the diaphragm, controlling the rotation of the diaphragm driving ring, not shown in the drawing. 304 is a pin provided on the above mentioned diaphragm driving ring, whereby the end of this pin 304 is engaged with the automatic aperture lever 305 energized counter-clockwise by means of the spring 305a. This automatic aperture lever 305 presents a rising up part 305c. Further, on the automatic aperture lever 305 an intermediary lever 307 is coaxially provided on the axis 306. 308 is the winding up shaft of the winding up lever, not shown in the drawing, whereby on the end face of this winding up shaft 308 a winding up cam 309 is fixed. 310 is a rotatable intermediary lever, whereby a pin 310a provided on the one end of this intermediary lever 310 is engaged with the winding up cam 309. At the other end of this intermediary lever 310 a pin 310b is provided so as to be engaged with the one end of the above mentioned intermediary lever 307 and at the same time with the one end 311a of the mirror driving lever 311. Further the first holding lever 313 is charged by the pin 310c provided on the intermediary lever 310. The other end of this intermediary lever 307 can be engaged with a pin 312a provided at the one end of the rotatable charge lever 312. This rotatable charge lever 312 is energized counter-clockwise by the spring 312d. $Mg_3$ is the first holding magnet with a permanent magnet engaging with the one end 313a of the first holding lever 313, while a pin 313b provided at the other end of the first holding lever 313 is engaged with the one end 314a of the release lever 314. This release lever 313 is energized clockwise by means of the spring 313c. Further it is so designed that when the lever 310 is rotated clockwise, the pin 310c drives the lever 313 counter-clockwise by means of the one end 313d of the lever 313 against the spring 313c. At the one end of this release lever 314 a pin 314b is provided so as to hold the one end 315a of the mirror driving engagement lever 315 engaged with one side 311c of the above mentioned mirror driving lever 311, whereby the lever 315 presents the other end 315b. Further, the end 314d of the release lever 313 holds the one end of the rotatable AE holding lever 316. Further at the other end of the release lever 314 a pin 314c is provided so as to hold the movable contact piece of the memory keeping switch $S_5$.

Hereby, the above mentioned switch $S_5$ is necessary only for the analogue memory device shown in FIG. 2 and not for the digital memory device shown in FIG. 1. The release lever 314 is energized clockwise by means of the spring 314f. Hereby the spring 314f is weaker than the spring 313c. 318 is the AE sector gear being held by the other end of the above mentioned holding lever 316. This sector gear 318 is the AE sector gear being held by the other end of the above mentioned holding lever 316. This sector gear 318 is engaged with the gears 319a, 319b and the stop wheel 319c so as to compose the speed adjusting mechanism 319. Further, on the sector gear 318 the slide piece $Rv_{6a}$ of the variable resistance $Rv_6$ for determining the aperture preset value is provided. On 318a of this sector gear 318 a gear 320 is provided, being engaged with the AE charge gear 321. On this gear 321 a lever 327 is at the same time fixed, lying on the other end 312e of the above mentioned charge lever 312. On the above mentioned sector gear 318 a pin 318b is provided, whereby the end face of this pin 318b is fixed on the signal lever 329 pivoted on the support lever 328. The curved end of this signal lever 329 holds the arm 303c of the above mentioned aperture preset ring 303. The above mentioned secter gear 313 is strongly energized clockwise against the spring 318c, energized counter clockwise on the sector gear 318. $Mg_1$ is an aperture control magnet with a permanent magnet, whereby the magnet $Mg_1$ in the excited state exercises a magnetic force in a direction opposed to that of the permanent magnet so as to compensate the latter force, while in the unexcited state of the magnet $Mg_1$ the permanent magnet exercises its magnetic force. The same thing can be said of the above mentioned magnet $Mg_3$ and the magnet $Mg_2$ to be explained later. Therefore in the non-excited state of the magnet $Mg_1$ the permanent magnet is in a position to attract the iron piece 331 provided on the lever 330. This lever 330 is energized counter-clockwise by means of the spring 331a whereby the curved end of the lever 330 can be engaged with the stop wheel 319c of the above mentioned speed adjusting mechanism 319. Hereby, the other end of the lever 330 is in contact with the step part 312f at the other end of the charge lever 312. A pin 332 in contact with the movable piece of the manual-auto changing over switch $S_6$ is provided at the side of the lens, while the end face of this pin 332 is in contact with the cam part 301b of the above mentioned aperture ring 301. The above mentioned mirror driving lever 311 presents a delay device, not shown in the drawing, being energized counter-clockwise by means of a spring 311d, whereby the one end of the lever 311 is held by the other end 315b of the above mentioned mirror driving engagement lever 315, while the other end is provided at a position at which it can be engaged with the one end of the front shutter plane holding lever 333. This front shutter holding lever 333 is energized counter-clockwise by means of a lever 333a, whereby the front end of the lever 333 is engaged with a pin 334 provided on the front shutter plane gear 334. Further, on the front shutter plane gear 334 a pin 334b is provided. This front shutter plane gear 334 is engaged with the front shutter plane pinion 335 of the front shutter plane drum, not shown in the drawing. Further, the mirror holding lever 336 is kept by the holding part 311b of the above mentioned mirror driving lever 311. This holding lever 336 is energized counter-clockwise by the spring 336a provided between the lever 336 and the lever 311, whereby the one end 337a of the push up lever 337 whose one end is coaxially pivoted on the mirror driving lever 311 is rotated clockwise by the upward mirror movement caused by a means, not shown in the drawing, so as to raise the mirror. The other end of this push up lever 337 holds the spring lift pin 338a provided on the mirror 338. This mirror 338 is rotatable around the mirror shaft as an axis. 338c is a spring for returning the mirror. 339 is the rear shutter gear provided coaxially with the above mentioned front shutter plane gear 334, being engaged with the rear shutter plane pinion 510 for the rear shutter plane drum, not shown in the drawing. On the rear shutter plane gear 339 a pin 339a is provided. 340 is a lever rotated by the above mentioned pin 339a and is attracted by the shutter control magnet $Mg_2$ with a permanent magnet. 341 is the rear shutter signal lever to be rotated by the above mentioned pin 339a, whereby the lever 341 is normally kept at the position of the holding pin 341b by means of a spring 341a. The end 336b of the above mentioned mirror holding lever 336 is engaged with the above mentioned rear shutter plane signal lever 341. The light beam coming through the photographic lens, not shown in the drawing, reaches the eye piece 345 through the mirror 338, the focus plate 342, the condenser lens 343 and the pentagonal prism 344 so as to be recognized by the photographer. PD is a light sensing element such as silicon blue cell. 347 is the shutter button whereby the switch $S_2$ is closed by the first stroke of the shutter button 347, while the switch $S_4$ is closed by the second stroke. 350 is the shutter time setting dial so designed that the shutter time input resistance $Rv_3$ is varied in functional engagement with the dial 350.

500 is the aperture value setting dial for adjusting the variable resistance $Rv_5$ shown in FIG. 1 and FIG. 2, 501 is the operation knob of the above mentioned switch $S_1$. Hereby, instead of building the set dial 500 and the operation button 501 in the camera body as is shown in FIG. 3, it is possible to make them as one unit so as to be mounted on the accessary shoe of the camera body. FIG. 4 shows an embodiment in such a case. In the drawing, 502 is the accessary shoe at the side of the camera, presenting the terminals $K_1$, $K_2$ and $K_3$. 503 is the camera accessaries engageable with the above mentioned shoe 502 by means of the mounting shoe 504. 505 is the operation button corresponding to the above mentioned button 501, which operates the switch $S_1$ shown in FIG. 1 and FIG. 2. 506 is an aperture dial corresponding to the above mentioned dial 500, whereby by operating the dial 506 the variable resistance $Rv_5$ shown in FIG. 1 and FIG. 2 is varied.

Next, the operation of the above mentioned mechanism will be explained. At first the case with priority on the shutter time will be explained. At first the shutter dial 350 is set at the desired time. At this time, the shutter time information resistance $Rv_3$ assumes a value corresponding to the shutter dial.

When then the AE index of the aperture ring 301 is set at the index 302 as is shown in the drawing, the switch $S_6$ is closed due to the contact situation of the cam part 301b with the pin 332, whereby the mode is in auto. Then the current source switch $S_2$ is closed, the shutter button 347 being pushed down so as to assume the operation state. When the shutter button 347 is pushed down further the switch $S_4$ is closed in such a manner that the magnetic force of the permanent magnet compensates that of the magnet $Mg_3$, whereby the first holding lever 313 is rotated clockwise by means of the spring 313c. Namely, by means of the pin 313b of the first holding lever 313 the release lever 314 is rotated counter-clockwise against the force of the spring 314f. Thus, the pin 314 is rotated counter-clockwise. In this way, the memory switch $S_5$ is opened by the pin 314c in such a manner that the voltage charged in the condenser $C_4$ is stored while at the same time, the mirror driving engaging lever 315 is rotated by the pin 314b, which will be explained later. In FIG. 2, the memory switch $S_5$ is used, while in FIG. 1 the signal when the switch $S_4$ is closed is applied to the NAND gate $G_1$ through FF so as to be stored as mentioned above. Further, it is possible to disengage the release lever 314 from the sector gear 318 by rotating the release lever 314 counter-clockwise. Further, by the rotation of the sector gear 318 the signal lever 329 is moved downwards through the pin 318b so that by the preset ring 303 holding the signal lever 329 on the arm 303c the sector gear 318 is rotated clockwise by means of the spring 303a against the spring 318c. In this way, the gears 319a, 319b and 319c composing the speed adjusting mechanism 319 are rotated in such a manner that the stop wheel at the last step is rotated counter-clockwise.

Further, by the rotation of the sector gear 318 the slide piece $Rv_{6a}$ of the variable resistance $Rv_6$ is moved. As soon as the value of this resistance reaches a certain determined level, the magnet $Mg_1$ is excited. Thus, the magnetic force of the permanent magnet compensates that of the magnet $Mg_1$ in such a manner that the iron piece 331 is freed. Thus the lever 330 is rotated counter-clockwise by means of the spring 331a, while the curved part is engaged with the stop wheel 319c so as to stop the rotation of the stop wheel 319c. In this way, the position of the sector gear 318 is decided. When the sector gear 318 stops its rotation the aperture preset ring 303 is rotated into a position corresponding to the proper aperture value in such a manner that the position of the bell crank is decided. In other words the position at which the aperture preset ring 303 stops corresponds to the aperture value decided by the information from the light sensing element PD for measuring the light beam coming through the photographic lens and various other set informations such as the shutter time, the film sensitivity, the exposure compensating information and so on. On the other hand, at the same time as the start of such AE operation the automatic aperture mechanism starts to operate. When namely, the first holding lever 313 is rotated clockwise by means of the spring 313c while the release lever 314 is rotated counter-clockwise, the end 315a of the mirror driving engagement lever 315 is rotated clockwise through the pin 314b. Namely, the one side 311c of the mirror driving lever 311 is disengaged from the one end 315b of the mirror driving engagement lever 315 in such a manner that the mirror driving lever 311 is rotated counter-clockwise by means of the spring 311d. At the same time, the claw 311b of the mirror driving lever 311 is engaged with the holding lever 336 so that the push up lever 337 pivoting the holding lever 336 is rotated counter-clockwise. Thus, the curved part 337b of the push up lever 337 is engaged with the raising up part 305 of the automatic aperture lever 305 so as to rotate the automatic aperture lever 305 clockwise. Hereby the pin 304 provided on the diaphragm driving ring is operated so as to close the diaphragm in accordance with the position of the above mentioned preset bell crank. Further by the counter-clockwise rotation of the push up lever 337 the raising up pin 338a of the mirror 338 is pushed up so as to raise the mirror 338.

At the same time as the upwards movement of the mirror takes place the delay means, not shown in the drawing, operates in such a manner that after the elapse of the time determined by this delay means the front shutter plane holding lever 333 is rotated clockwise by the above mentioned mirror driving lever 311. The delay time of this delay means is sufficient to permit the shutter start to run after the elapse of the time which is necessary to close the diaphragm from the totally opened state to the least opened state. Thus, the front shutter plane gear 334 starts to rotate so as to allow the front shutter plane to start to run through the front shutter plane pinion 335. In response to the start of the front shutter plane the count start switch $S_3$ is opened in the conventional way so as to start the integration in such a manner that after the elapse of the time corresponding to the set shutter time the comparator $CM_3$ is controlled so as to actuate the magnet $Mg_2$ for controlling the rear shutter plane. In this way, the magnetic force of the permanent magnet compensates that of the magnet $Mg_2$. Thus, the locking of the rear shutter plane gear 339 by means of the lever 340 is accomplished so as to allow the rear shutter plane gear 339 to start to rotate in such a manner that the rear shutter plane starts to run through the rear shutter plane pinion 510. When the rear shutter plane has run, in response to the rotation of the rear shutter plane gear 339 the rear shutter plane signal lever 341 is rotated counter-clockwise through the pin 339a so as to rotate the mirror holding lever 336 clockwise. In response to the rotation of the mirror holding lever 336 the mirror driving lever 311 is disengaged from the lever 336. Thus, the raising up lever 337 is rotated clockwise by means of the spring 305a through the automatic aperture lever 305, while the mirror 338 is brought back into the initial position by the returning spring 338c. Further, at the same time, the automatic aperture lever 305 is rotated counter-clockwise by means of a spring 305a, while the pin 304 provided on the diaphragm driving ring returns to the initial position, whereby the initial totally opened state of the diaphragm is resumed. In response to the winding up operation of the winding up shaft 308 the film winding up as well as the shutter charge operations are carried out, while the intermediary levers 310 and 307 the charge lever 312 are charged, while the parts disengaged by the above mentioned release operation for charging the automatic aperture mechanism as well as the mirror mechanism are again engaged with each other, namely brought back into the state shown in the drawing. Next, the operation of a camera with the aperture value priority mode photography will be explained. Hereby, the appointing part $B_1$ is same, no matter whether the part $B_1$ is built in the camera body or it is mounted on the accessary shoe and therefore the latter case will be explained. The analog switches $As_1$ and $As_2$ are controlled by the change over switch $S_1$ in the appointing part $B_1$, in such a manner that if the switch $S_1$ is closed the common terminals are switched over from the terminals a to the terminals b.

As is explained in accordance with the FIG. 1 and FIG. 2, the aperture control magnet $Mg_1$ operates in accordance with the aperture value set in the appointing part $B_1$, while the magnet $Mg_2$ for controlling the rear shutter plane is controlled by the value obtained from the aperture information, the object brightness information, the film sensitivity information and so on. Namely, the shutter time is automatically decided with priority on the aperture value. Then the mechanism operates in the same way as in the case of the shutter time priority photography.

In shutter time priority mode photography the switch $S_1$ is opened in such a manner that the analogue switches $As_1$ and $As_2$ are connected to the terminal a, so as to carry out the above mentioned shutter time priority mode photography. If the appointing part $B_1$ is in form of an accessary, as is shown in FIG. 4, the switch $S_1$ is eliminated so as to realize a direct connection to the camera body, whereby it is sufficient to mount the accessary on the camera in order to realize the aperture value priority mode photography.

Next, the operation wherein the setting is manually carried out will be explained. When the desired aperture value of the aperture ring 301 is set at the index 302, the switch $S_6$ is opened so as to be changed over to manual, because the pin 332 is out of the engagement with the cam part 301b, whereby the magnet $Mg_2$ for controlling the diaphragm is not excited so that the iron piece 331 remains attracted by the $Mg_1$. When the shutter button 347 is then pushed down the current source switch $S_2$ is closed so as to start the light measurement. When the shutter button is further pushed down the first holding magnet $Mg_3$ with a permanent magnet is oppositely excited in the same way as in case of the shutter time priority mode photography in such a manner that the first holding lever 313 is rotated clockwise by means of the spring 313c. Namely, the release lever 314 is rotated counter-clockwise by the one end of the first holding lever 313. Namely the released lever 313 is rotated counter-clockwise against the spring 314f. By the counter-clockwise rotation of the release lever 314 the holding lever 316 is rotated counter-clockwise so as to be disengaged from the sector gear 318. Thus, the sector gear 318 is rotated against the spring 318c by means of the spring 303 through the preset ring 303 and the signal lever 329, so that the signal lever 329 is lowered down to the determined position through the pin 318b. Thus, the aperture preset ring 303 holding the arm 303c on the signal lever 329 is rotated by means of the spring up to the position of the projection 301a of the aperture ring 301. In this way, the preset ring 303 is rotated into the position corresponding to the set aperture value so as to determine the position of the bell crank.

Further, in response to the counter-clockwise rotation of the release lever 314 the automatic diaphragm mechanism starts. Namely by the rotation of the release lever 313 the mirror driving engagement lever 315 is rotated clockwise by means of the pin 314b so as to close the diaphragm in the same way as in the case of the shutter time priority mode and at the same time to raise the mirror 338 for starting the shutter. After this control of the shutter, the mirror 338 and the automatic aperture lever 305 return to their initial positions in the same way as in the case of the shutter time priority mode.

Figure 5:
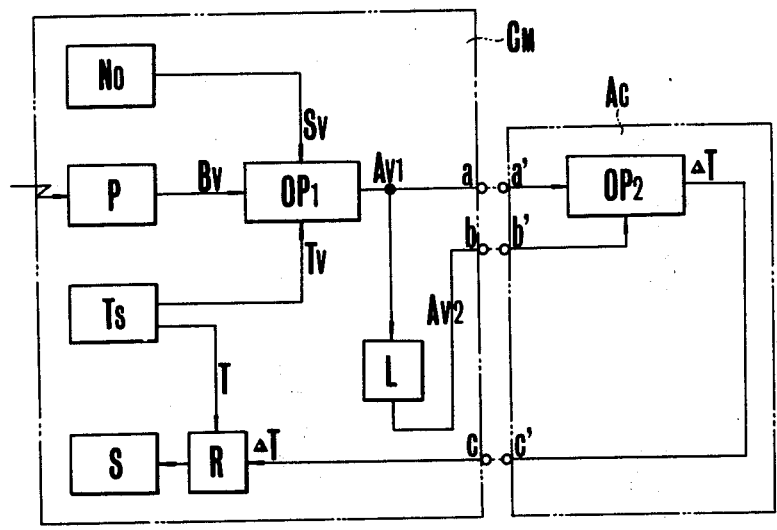
FIG. 5 shows a block diagram for explaining the principle of another embodiment of the present invention.

FIG. 5 shows an electric block diagram of another embodiment of the present invention. In the drawing, CM is an AE camera with priority on shutter time, whereby a, b and c are the signal input terminals provided on the accessary shoe and Ac is the camera accessary. When the camera accessary Ac is mounted on the camer body CM, the terminals a', b' and c' are respectively connected to the terminals a, b and c. The camera CM is the conventional AE camera with priority on shutter speed, No the film sensitivity setting circuit (Sv information source), P the object brightness measuring circuit including a light sensing element (Bv information source), Ts the shutter time setting circuit (Tv information source) and S the shutter time control circuit for controlling the magnet by means of the output of the timing circuit. $OP_1$ is the operation circuit for producing an aperture value for obtaining a proper exposure condition out of the signals of the above mentioned various photographic information sources. L is the diaphragm mechanism of the photographic lens, while R is the operation device in accordance with the present invention. Further, at the side of the accessary Ac the second operation circuit $OP_2$ is provided, whereby the shutter time correcting value $\Delta T$ produced at its output terminal is delivered to the side of the camera through the terminals c'–c.

Next the operation of a device as is shown in FIG. 5 will be explained. If the camera accessary Ac is not mounted on the camera the camera CM operates as conventional AE camera with priority on shutter time. Namely, the Sv information from the film sensitivity information source No, the Bv information from the object brightness information source P and Tv information from the shutter time information source Ts are conducted to the operation circuit $OP_1$ at whose output terminal the aperture information $Av_1$ is produced so as to control the diaphragm mechanism L of the photographic lens. At this time, the shutter time control circuit S is controlled by the output T of Ts.

If the camera accessary in accordance with the present invention is mounted on the camera body, the terminals a, b and c are respectively connected to the terminals a', b' and c' so as to compose a circuit composition as is shown in the drawing. The aperture information $Av_1$ obtained by the operation circuit $OP_1$ is conducted to the camera accessary Ac from the signal input output terminal a of the camera CM through the terminal a' while, the aperture value information $Av_2$ set at the diaphragm mechanism L of the photographic lens is conducted to Ac from the terminal b through the terminal b'. These two Av informations are conducted to the second operation circuit $OP_2$ provided in Ac, whereby at the output of the second operation circuit $OP_2$ a time information $\pm \Delta T$ corresponding to the difference between these two aperture informations is produced. This time correcting information $\pm \Delta T$ is delivered through the terminal c'–c to the side of the camera CM, so as to be operated on (addition or subtraction) together with T delivered to the operation device R from the time information source Ts, whereby at the output of the operation device R the time information $T \pm \Delta T$ is produced so as to control the shutter time control circuit S. By setting at the diaphragm mechanism L to aperture values $Av_2$ different from the value $Av_1$ obtained at first by the operation circuit $OP_1$ by means of the above mentioned operation, the time correcting value $\pm \Delta T$ corresponding to the difference between $Av_1$ and $Av_2$ is delivered from Ac to CM by means of the control mode selecting means provided in the accessary Ac in such a manner that the time T set at first is corrected into $T \pm \Delta T$ so as to let the shutter time control circuit operate, so that the camera operates in the same way as in the aperture priority mode.

Figure 6:
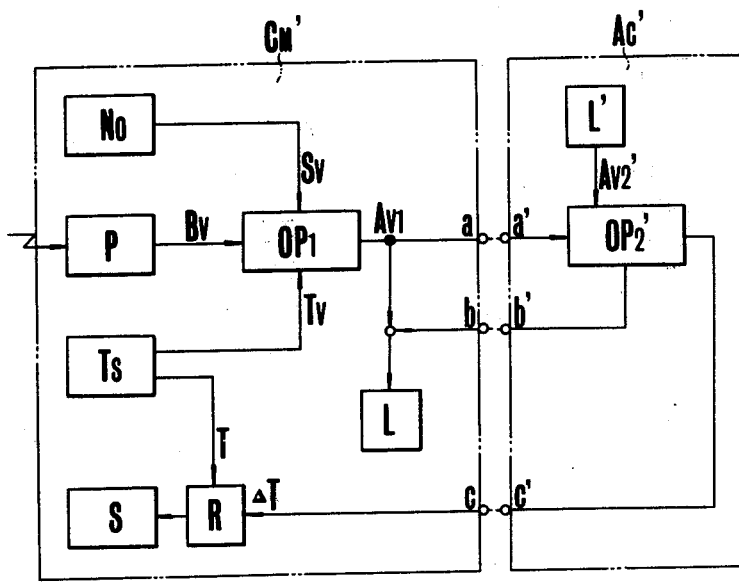
FIG. 6 shows a block diagram for explaining the principle of further another embodiment of the present invention.

FIG. 6 shows a circuit diagram of another embodiment of the camera accessary in accordance with the present invention, whereby the same elements as in FIG. 5 are indicated by the same symbols. In the drawing, CM' is a camera with priority on shutter time provided with a mount on which the camera accessary can be mounted, while Ac' is the camera accessary mountable on CM'. L' is the aperture control circuit and $OP'_2$ the operation circuit operating in the same way as $OP_2$ shown in FIG. 1 for changing over the control mode. Next the operation of the device shown in FIG. 6 will be explained. A description of the operation wherein the accessary is not used is omitted, because its operation is similar to that of the device shown in FIG. 1. If the camera accessary Ac' according to the present invention is mounted, the aperture information $Av_1$ produced by the operation $OP_1$ at the side of the camera is applied to the operation circuit $OP_2$ at the side of the accessary through the terminal a–a'. Ac' presents the aperture control circuit L', whereby the aperture information $Av'_2$ set in the circuit L' is applied to the above mentioned operation circuit $OP'_2$ too, so as to produce the shutter time correcting information $\pm \Delta T$ corresponding to the difference between $Av_1$ and $Av'_2$. Further $Av_2$ from $L'_1$ is delivered from $OP'_2$. $Av_2$ and $\pm \Delta T$ are sent back to the side of the camera CM' through the terminal b'–b and c'–c, while the aperture information $Av_2$ controls the diaphragm mechanism L, so as to determine the aperture value and the shutter time correcting information $\pm \Delta T$ is added to the shutter time information T from Ts in the operation device R in such a manner that the shutter time control circuit S is controlled by the output $T \pm \Delta T$.

As explained above, when the camera accessary Ac' is mounted on the AE camera CM' with priority on shutter speed, the camera CM' is controlled by the aperture information $Av_2$ set in the aperture control circuit L' so as to operate in the same way in the case of a camera with priority on aperture value. Hereby, it goes without saying that the accessaries Ac and Ac' shown in FIG. 5 and FIG. 6 can be built in the camera body, while when they are composed in the form of accessaries the photographic mode can automatically be changed over to the aperture value priority mode by mounting the accessary Ac, Ac' on the camera body, which is convenient.

Figure 7:
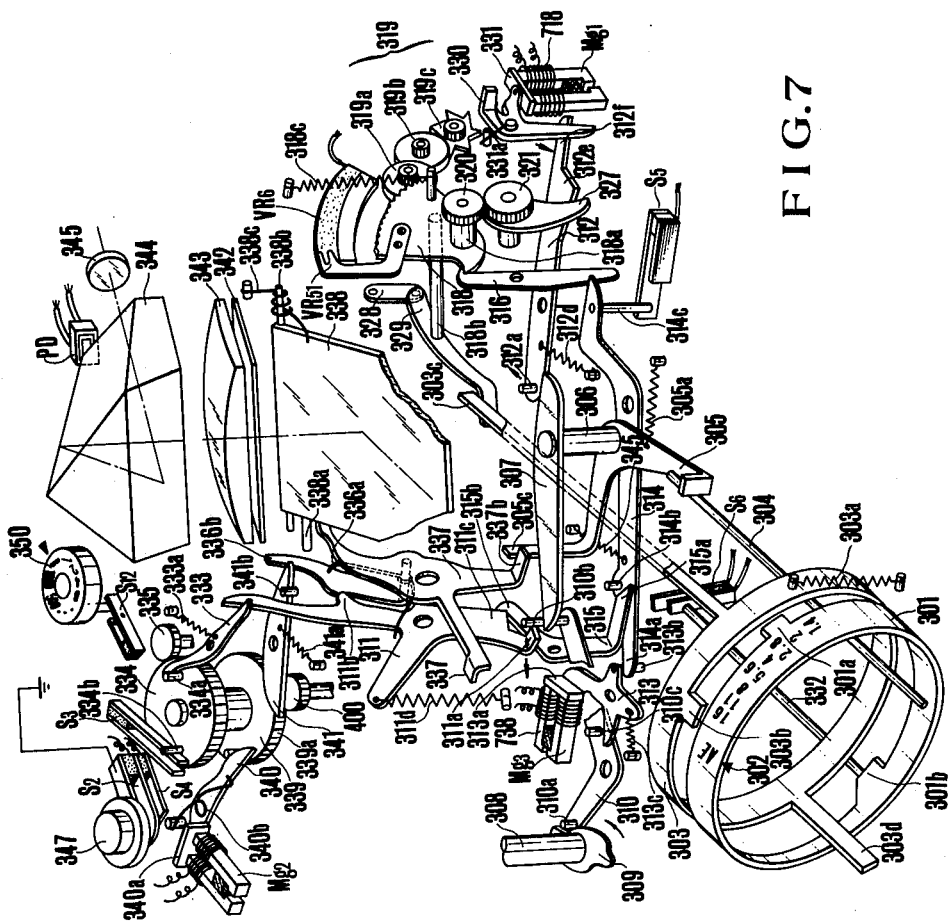
FIG. 7 shows an exploded view of a single reflex camera to be used with the electric circuits whose block diagram is shown in FIG. 5 or FIG. 6.

FIG. 7 shows an embodiment of the single lens reflex camera with priority on shutter time on which the camera accessary shown in FIG. 6 can be mounted, especially the important elements of the interior mechanism in the camera body, whereby the elements with the same references as in FIG. 3 are the same as those in FIG. 3. The drawing shows the wound up state of the film, namely the charged state of the shutter. In the drawing 350 is the shutter time setting dial designed in such a manner that in functional engagement with the dial 350 the shutter time input resistance $Rv_3$ as is shown in FIG. 3 is varied, while an additional normally opened switch $S_{12}$ is provided in functional engagement with dial 350 so as to be closed when the dial 350 is set at the "B" photography. Other compositions in FIG. 7 are the same as in FIG. 3 so that their explanations will be omitted.

Figure 8:
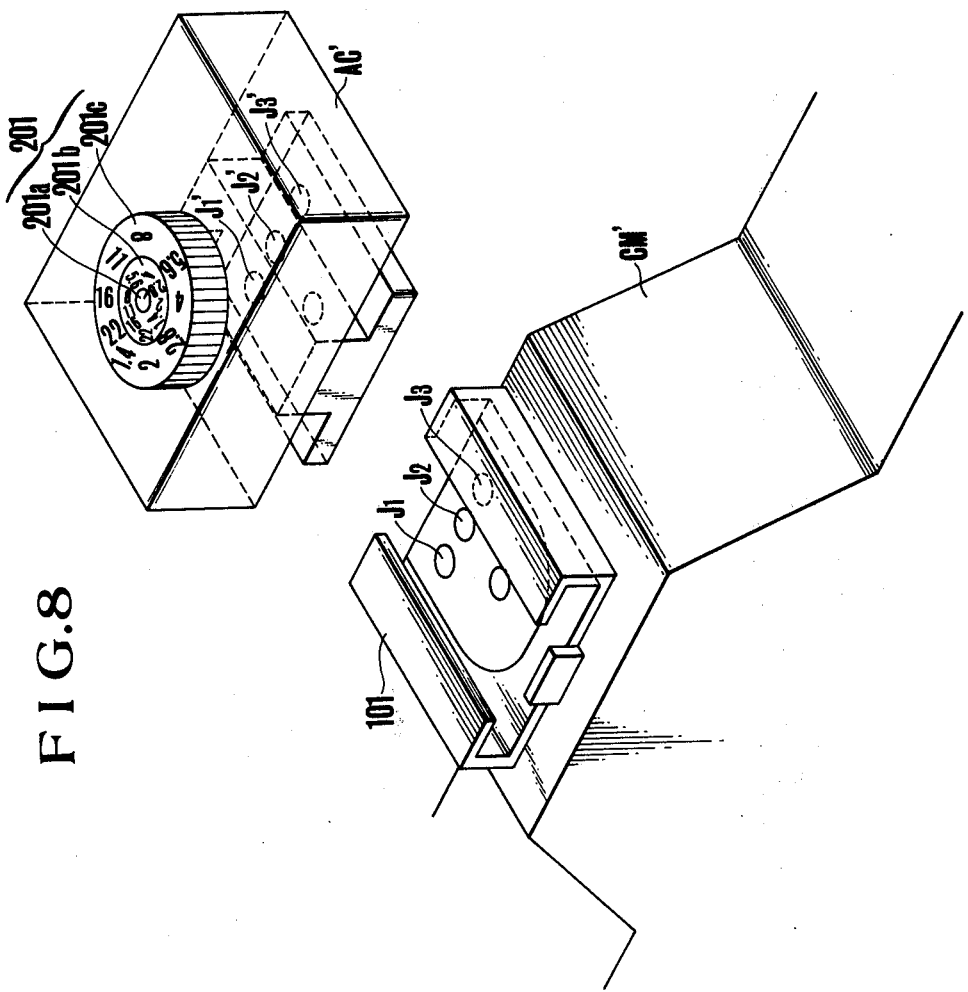
FIG. 8 shows an exploded view of the aperture value priority setting part made as unit, of the block diagram shown in FIG. 5 or FIG. 6.

FIG. 8 shows the mount for the camera accessary and the accessary of the camera shown in FIG. 7. In FIG. 8 CM' is the camera body, 101 the mount for the camera accessary. $J_1$, $J_2$ and $J_3$ in the mount for the accessary are the connecting terminals through which signals are exchanged between the camera accessary and the camera CM'.

Ac' is the camera accessary in accordance with the present invention in which an aperture control device is built. 201 is the aperture control value setting knob which is set to the desired range of aperture by setting both aperture control knobs 201c and 201b at the index 201a. 201c can be independently moved, being moved upwards. 201b and 201c are respectively functionally engaged with the variable resistances to be explained later. $J'_1$, $J'_2$ and $J'_3$ are the terminals through which the signals are exchanged between the camera body and the camera accessary.

Figure 9:
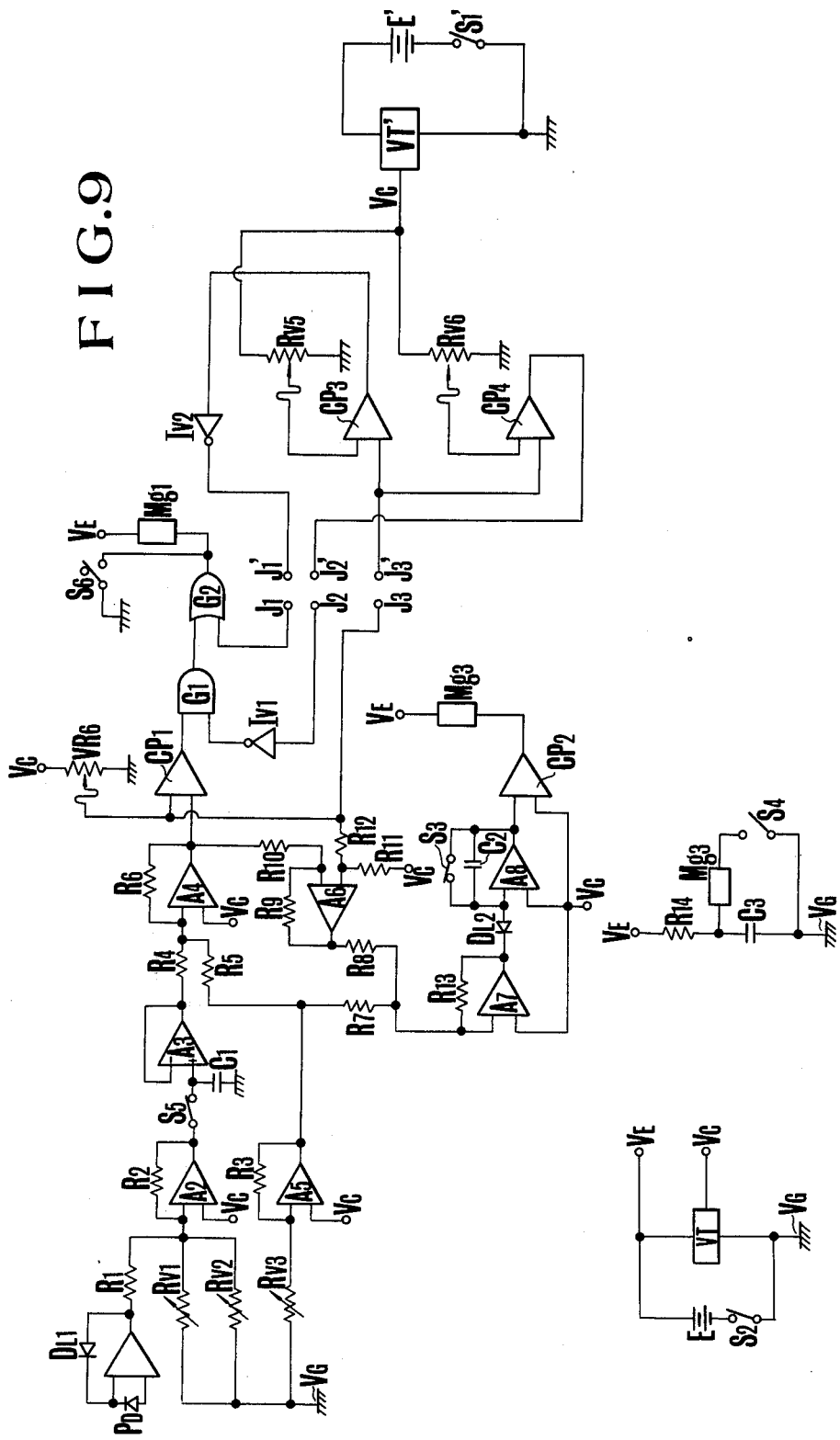
FIG. 9 shows a circuit diagram of the block diagram shown in FIG. 5.

FIG. 9 shows an embodiment of the exposure control circuit in the camera body and the camera accessary shown in FIG. 7 and FIG. 8. In the drawing, $S_2$, $S_4$, $S_5$, $S_3$ and $S_6$ as well as $Mg_1$, $Mg_3$ and $Mg_2$ are respectively the same switches as well as the same magnets as shown in FIG. 7 with the same symbols. Hereby, $J_1$, $J_2$ and $J_3$ are the terminals provided in the mount at the side of the camera body, while $J'_1$, $J'_2$ and $J'_3$ are the terminals provided in the accessary. In the drawing, PD is the light sensing element such as a silicon photodiode, $DL_1$ the logarithm diode for logarithmic compression and $A_1$ the operational amplifier whereby an object brightness measuring circuit consists of the above mentioned elements so as to produce the brightness information Bv at the output terminal. $Rv_1$ is a variable resistance for setting the film sensitivity Sv, while $Rv_2$ is a variable resistance for correcting the totally opened aperture value F of the photographic lens, whereby Avc is automatically set by the lens mounting. Bv, Sv and Avc are added to each other by the addition device $A_2$ and stored in the memory condenser $C_1$ through the memory switch $S_5$. The output of the addition device $A_2$ is $-(Bv-Avo-Avc+Sv+Avc)=-(Ev-Avo)$, which is stored in $C_1$ as terminal voltage. The shutter time information set $Rv_3$ is inverted by inverter $A_5$ and delivered out as $-Tv$. $A_3$ is the voltage follower with high input impedance, whereby the measured light value before the rise of the mirror in response to pushing down the shutter button is stored in $C_1$ even after the switch $S_5$ is opened. The output of $A_3$ and of $A_5$ is applied to the addition device $A_4$, at whose output terminal the aperture information $-\{-(Ev+Avo)+Tv-\}=Ev-Tv-Avo=Av-Avo$ is produced. This aperture information $Av-Avo$ is put in the comparator $CP_1$ so as to be compared with the output of the variable resistance $VR_6$ in functional engagement with the aperture setting pin, whereby the logic "1" is produced when both signals coincide with each other. This output is applied to the AND gate $G_1$, whereby when no accessary is mounted on the camera body the output of the inverter $Iv_1$ is "1" because the terminal $J_2$ is at "0" while $G_1$ is closed in such a manner that the aperture control magnet $M_1$ is directly controlled by the output of $CP_1$ through the OR gate $G_2$, so as to determined the aperture value. When the aperture value is set at $VR_6$ this set value and the output of $A_4$ are applied to the addition device in such a manner that the step number of the difference is detected so as to correct the shutter time. Namely, in the addition device $A_7$ the set shutter time information Tv is connected through the resistance $R_7$ while in the addition device $A_6$ the above mentioned correcting information is connected through the resistance $R_8$ in such a manner the shutter time is corrected, whereby the integration circuit (the actual time enlarging circuit) consisting of the logarithm diode $DL_2$, the condenser $C_2$ and the operational amplifier $A_8$ starts to operate while $C_2$ starts to be charged from the point in time at which the switch $S_3$ is opened at the same time as the start of the front shutter plane, whereby the comparater $CP_2$ detects the point in time at which the output of $C_2$ reached a certain determined value so as to allow the rear shutter plane to start to run by means of the magnet $Mg_3$. Thus, the AE exposure is completed with only the camera body.

Next the case in which the accessary in accordance with the present invention is mounted on the camera body will be explained. In this case the terminals $J_1$, $J_2$ and $J_3$ are respectively connected to the terminals $J'_1$, $J'_2$ and $J'_3$. The aperture value at the closed side is set by the variable resistance $Rv_5$ at the side of the accessary while the aperture value at the opened side is set by the variable resistance $Rv_6$. When it is desired that a photograph could be taken in the aperture range, for example, between F 4 and F 5.6, F 5.6 is set at $Rv_5$ and F 4 at $Rv_6$. The comparators $CP_3$ and $CP_4$ compare the aperture information sent from the variable resistance $VR_5$ through the terminals $J_3$–$J'_3$ with the informations set at $Rv_5$ and $Rv_6$ so as to produce "1" until the informations coincide with each other and "0" when they have coincided with each other. The output of the comparator $CP_4$ is applied to the AND gate $C_1$ through the terminal $J'_2$–$J_2$ and inverter $Iv_1$, whereby the gate $G_1$ is opened until the output of $VR_4$ assumes the value corresponding to F 4, when for example $Rv_6$ is set at F 4. In consequence, when the operation output ($A_4$ output) at the side of the camera corresponds to F 2.8, $Mg_1$ operates at F 4, while if the operation output corresponds to F 4.5, $Mg_1$ operates at F 4.5. Further, when F 5.6 is set at $Rv_5$, the output of $CP_3$ is "0" when the output of $VR_5$ is F 5.6, whereby the inverter $Iv_2$ produces "1", which closes the OR gate $G_2$ through the terminal $J'_1$–J, so as to control $M_1$. The output of $A_4$ and that of $VR_6$ are applied to $A_6$ in such a manner that the difference is detected so as to obtain the proper exposure, the shutter time being corrected.

Hereby, E is the current source at the side of the camera, $S_1$ the current source switch, VT the standard voltage generator, while a similar current source circuit E', S' and VT' is provided at the side of the camera accessary. When hereby a separate standard voltage supply terminal is provided between the camera and the camera accessary, the current source at the side of the camera can be used in common for the camera accessary. Further, the circuit consisting of $Mg_3$, $R_{14}$, $C_3$ and $S_2$ represents the first holding circuit as is shown in FIG. 7, whereby the release operation of the shutter button closes the switch $S_4$ so as to release the holding, the holding magnet $Mg_2$ being operated.

Next, the operation of the above mentioned composition will be explained. At first the case when no accessary is mounted on the camera will be explained, whereby the camera operates with priority on shutter time. At first the shutter dial 350 and the ASA sensitivity setting dial, not shown in the drawing, are respectively set at the desired time and the desired sensitivity. When the AE index of the aperture ring is then set at the index 302, as is shown in the drawing, the contact situation of the cam part 301b with the pin 332 changes over the switch $S_6$ to the auto side. When by pushing down the shutter button 347 the switch $S_2$ is then closed the operation circuit is actuated in such a manner that the electrical signal Bv corresponding to the brightness of the object logarithmically compressed by means of the photo diode PD, the logarithm diode $DL_1$ and the amplifier $A_1$, the electrical signal Sv by means of the variable resistance $Rv_1$ in functional engagement with the ASA sensitivity setting dial and the electrical signal Avc corresponding to the vignetting compensating information of the photographic lens by means of the variable resistance $Rv_2$ automatically set by the lens mounting are operated in the addition device such as the amplifier $A_2$ in such a manner that the signal starts to be charged in the memory condenser $C_1$. When the shutter button 347 is pushed down further, the switch $S_4$ of the first holding circuit is closed. As the result a driving current is applied to the magnet $Mg_3$ in such a manner that the magnetic force of the permanent magnet compensates that of the magnet $Mg_3$ whereby, the first holding lever 313 is rotated clockwise by means of the spring 313c. Namely by means of the pin 313b of the first holding lever 313 the release lever 314 is rotated counter-clockwise against the force of the spring 314f. Thus, the memory switch $S_3$ is opened by means of the pin 314c so that the voltage of the charged condenser $C_4$ is kept while the mirror driving engagement lever 315 is rotated by means of the pin 314b, which will be explained in detail later. The voltage of the charged condenser $C_1$ is amplfied by the amplifier $A_3$ and operated on in the amplifier $A_4$ together with the electrical signal $-Tv$ by means of the variable resistance $Rv_3$ functionally engaged with the shutter dial 350 so as to be applied to the comparator $CP_1$. Further, in response to the counter-clockwise rotation of the release lever 314 the holding lever 316 is rotated counter-clockwise so as to be disengaged from the sector gear 318. Further by the rotation of the sector gear 318 the signal lever 329 is moved downwards through the pin 318b so that the aperture value preset ring 303 keeping the arm 303c on this signal lever 329 rotates the sector gear 318 clockwise by means of the spring 303a against the force of the spring 318c. Consequently, the gears 319a, 319b and 319c composing the speed adjusting mechanism 319 rotate whereby the stop wheel at the last step rotates counter-clockwise. Further, in response to the rotation of the sector gear 318 the slide piece Rai of the variable resistance $VR_5$ is moved. The output of this variable resistance $VR_5$ and that of the amplifier $A_4$ are applied to the comparator $CP_1$, so as to produce the output "1" when both signals coincide with each other. (The output signal when they do not coincide with each other is "0"). The signal from the comparator $CP_1$ and that from the inverter $Iv_1$ are applied to the AND gate $G_1$. When no accessary in accordance with the present invention is mounted on the camera, the output from the connecting terminal $J_2$ is "0" so that the output from the inverter $Iv_1$ is always "1". Consequently the aperture control magnet $M_1$ is directly controlled by the output of the comparator $CP_1$ in such a manner that the magnet $Mg_1$ is supplied with current. Thus, the magnetic force of the permanent magnet is compensated with that of the magnet $Mg_1$ so that the iron piece 331 is freed. Consequently, the lever 330 is rotated counter-clockwise by the spring 331a in such a manner that the curved part is engaged with the stop wheel 319c so as to stop the rotation of the stop wheel 319c. In this way, the position of the sector gear 318 is determined and stops, when the aperture preset ring 303 is rotated into the position corresponding to the proper aperture value in such a manner that the position of the bell crank is determined.

In other words, the position at which the aperture preset ring 303 stops corresponds to the aperture value determined by the information from the light sensing element P for measuring the light beam coming through the photographic lens and other various set informations, such as the shutter time and the film sensitivity exposure compensation informations. On the other hand parallel to the start of the AE operation the automatic diaphragm mechanism also starts to operate. Namely, the first holding lever 313 rotates clockwise by means of the spring 313c while the release lever 314 is rotated counter-clockwise in such a manner that the end 315a of the mirror driving engagement lever 315 is rotated clockwise by means of the pin 314b. Namely, the one side of the mirror driving lever 311 is disengaged with the one end of the mirror driving engagement lever 315 whereby by means of the spring 311d the mirror driving lever 311 is rotated counter-clockwise. At the same time, the claw 311b of the mirror driving lever 311 remains engaged with the holding lever 336 so that the push up lever 337 pivoting the holding lever 336 is rotated counter-clockwise. Consequently, the curved part 337b of the push up lever 337 is engaged with the rising up part 305c of the automatic aperture lever 305 so as to rotate the lever 305 clockwise. In this way, the pin 304 provided on the aperture driving ring is operated so as to close the diaphragm in accordance with the position of the above mentioned bell crank on which the aperture value is set. Further by the counter-clockwise rotation of the push up lever 337 the raising pin 338a of the mirror is pushed up so as to lift the mirror.

At the same time as the rising operation of this mirror is taking place, the delay device, not shown in the drawing, operates in such a manner that after the elapse of the time given by the delay device the front shutter holding lever 333 is rotated clockwise by means of the above mentioned mirror driving lever 311. The time given by the delay device is intended to let the shutter start to run after the time interval during which the totally opened diaphragm is closed down to the least opened diaphragm. Thus, the front shutter plane gear 334 starts to rotate so as to let the front shutter plane run through the front shutter plane pinion 335. In response to the start of the front shutter plane the count starting switch $S_3$ is opened in the conventional way, whereby after the elapse of the time corresponding to the set shutter speed the output current of the comparator $CP_2$ is applied to the magnet $M_2$. Thus, the magnetic force of the permanent magnet is compensated with that of the magnet $Mg_3$, whereby the locking of the rear shutter plane 339 by the lever 340 is accomplished so as to allow the rear shutter plane gear to start to rotate in such a manner that the rear shutter plane starts to run through the rear shutter plane pinion 340. When the rear shutter plane has run, the rotation of the rear shutter plane gear 339 rotates the rear shutter plane signal lever 336 counter-clockwise by means of the pin 339a so as to rotate the mirror holding lever 336 clockwise. In response to this rotation the mirror holding lever 336 is disengaged from the mirror driving lever 311. Thus, the push up lever 337 is rotated clockwise by means of the spring 305a through the automatic aperture lever 305 in such a manner that the mirror 338 is brought back into the initial position by means of the returning spring 338c. Further at the same time, the automatic aperture lever 305 is rotated counter-clockwise by means of the spring 305a whereby the pin 304 provided on the aperture driving ring returns to the initial position in such a manner that the diaphragm resumes the totally opened initial state. When the winding up operation is carried out by the winding up shaft 308, the film is wound up and the shutter is charged while the charge, lever 312 is charged by the intermediary levers 310 and 307, whereby the parts disengaged from each other by the above mentioned release operation for charging the automatic diaphragm mechanism and the mirror mechanism are engaged with each other again so as to resume the state shown in the drawing.

Next the function of the camera with manual operation will be explained. When then the desired aperture value of the aperture ring 301 is set at the index 302, the switch $S_{11}$ is changed over to the manual side because the pin 332 is out of the engagement with the cam part 301b so as to bring the magnet $Mg_1$ and the control circuit in an inoperable state. When then the shutter button 347 is pushed down the memory condenser $C_1$ starts to be charged in the same way as in the case wherein the priority is on shutter time. When the shutter button 347 is pushed down further the magnet $Mg_3$ and the control circuit are supplied with current so as to be actuated in the same way as in the case wherein the priority is on shutter time. Then, in the same way as in the case wherein the priority is on shutter time the first holding magnet $Mg_2$ with permanent magnet is excited in such a manner that the first holding lever 313 is rotated clockwise by means of the spring 313c. Namely, by means of the one end 313b of first holding lever 313 the release lever 314 is rotated counter-clockwise. Namely, the release lever 314 is rotated counter-clockwise against the force of the spring 314f. By the counter-clockwise rotation of the release lever 314 the holding lever 316 is rotated counter-clockwise so as to be disengaged from the sector gear 318. Thus, the sector gear 318 is rotated clockwise against the force of the spring 318c by means of the spring 303a through the preset ring 303 and the signal lever 329 so to lower the signal lever 329 down to the determined position through the pin 318b. Thus, the aperture preset ring 303 with the arm 303c held by the signal lever 329 is rotated by the spring 303a up to the position of the projection 301a of the aperture ring 301. Thus, the aperture preset ring 303 is rotated upto the position corresponding to the determined aperture value so as to determine the position of the bell crank.

Further in response to the counter-clockwise rotation of the release lever 314 the automatic diaphragm mechanism also starts to operate. Namely the rotation of the release lever 313 rotates the mirror driving engagement lever 315 clockwise by means of the pin 314b so as to close the diaphragm in the same way as in the case of priority on shutter time and at the same time to raise the mirror 338, whereby the shutter is started. Also, after this control of the mirror, the mirror 338 and the automatic aperture lever 305 are brought back into their initial positions in the same way as in the case of priority on shutter time.

Next, the case wherein the camera accessary Ac' in accordance with the present invention is mounted on the camera CM' with priority on shutter time will be explained. At first the shutter dial 350 of the camera body CM', the ASA sensitivity setting dial, not shown in the drawing, and the aperture ring 301 of the photographic lens are set in the same way as in the case of priority on shutter time. Then, the aperture control button 210 of the camera accessary Ac' is set in the desired range, for example in case it is desired to control the aperture in the range F 4 and F 5.6, 201b is set at "4" and 201c is set at "5.6" of the index 201a. By this operation $Rv_6$ and $Rv_5$ are respectively set at their determined positions. The comparators $CP_3$ and $CP_4$ in the camera accessary respectively compare the output of the $VR_5$ obtained through the terminal $J_2$–$J'_2$ with the output of $Rv_5$ and the output of $Rv_6$ so as to produce "1" until both outputs coincide with each other and "0" when they have coincided with each other.

When the shutter button 347 is pushed down the memory condenser $C_1$ starts to be charged in the same way as in the case of priority on shutter speed. When the shutter button 347 is then pushed down further the same operation as in the case of the priority on shutter time is carried out in such a manner that if the output of the amplifier $A_4$ corresponds to F 2.8 the comparator $CP_4$ at the side of the camera accessary produces the signal "1" until the output $VR_6$ corresponds with F 4. This signal is delivered to the side of the camera through the terminal $J_2$–$J'_2$ so as to be inverted into "0" by $Iv_1$ and checked by the AND gate, whereby $Mg_1$ does not operate. When the output of the variable resistance $VR_6$ reaches F 4 the output signal of the comparator $CP_4$ becomes "0" which is inverted into "1" by the inverter $Iv_1$ whereby the magnet $Mg_1$ operates because the output of the comparator $CP_1$ is then "1".

Further, if the output of the amplifier $A_4$ is F 4.5 the AND gate $G_1$ is opened, whereby $Mg_1$ operates with F 4.5. If the output of $A_4$ corresponds with F 8, the comparator $CP_3$ at the side of the camera accessary produces a signal "0" through the terminals $J_3$–$J'_3$ when the output of the variable resistance $VR_6$ corresponds with F 5.6 which signal is inverted into "1" by the inverter $Iv_2$ so as to operate the magnet $M_1$ with F 5.6 through the terminals $J_1$–$J'_1$, the OR gates $G_1$.

The difference between the output of the amplifier $A_4$ and that of the variable resistance $VR_6$ is detected by the amplifier $A_6$ by means of whose output signal the shutter time initially set is compensated so as to obtain a proper exposure. The operation after this is the same as in the case of an automatic camera with priority on shutter time and therefore the explanation is here omitted.

When 201b and 201c of 201 are set to the same value, this camera system can serve as the camera with priority on aperture value regardless of the set shutter time.

As explained above in detail the camera accessary is provided with a control means by means of which the shutter time is corrected to obtain a proper exposure in accordance with the decided aperture value, so that in case it is desired to take a photograph with a predetermined depth of field or with full automatic exposure it becomes possible for the photographer to select whichever photography be desired by mounting the camera accessory on the camera with priority on shutter time. Namely, it is possible to alter a camera with priority on shutter time such that it performs as a camera with priority on aperture value.

Although the composition of the camera accessary is remarkably simple, as explained above, by simply mounting the accessary on an AE camera with priority on shutter speed the camera can be converted into the one with priority on the aperture value, so that it can be said very profitable for the operation of camera.

Hereby it goes without saying that instead of composing the camera accessary Ac' so as to be mountable on the camera body as shown in FIGS. 5, 6 and 8, it can be built into the camera body in advance, as in the case of the embodiment shown in FIG. 3, while on the camera body the aperture value setting dial for the aperture value priority mode can be provided beside the shutter time setting dial. In this case it is sufficient to provide a change over switch (corresponding to the switch $S_1$ in FIG. 1) so as to carry out the mode change over in such a manner that the terminals $J_1$–$J'_1$, $J_2$–$J'_2$ and $J_3$–$J'_3$ are connected only at the time of the aperture mode, priority value while the terminals remains connected to each other in FIG. 9.

As explained above in accordance with the present invention only by connecting a control circuit additionally to the camera provided with an exposure control circuit with priority on shutter time the exposure control circuit can also be used for the aperture value priority mode, so as to be able to take a photograph with the aperture value mode, whereby the change-over can be carried out by means of a single operational member, while if an additional unit is composed in form of an accessary, the change-over is carried out automatically when the unit is mounted on the camera body in such a manner that by setting the aperture at the desired value the photographic mode change-over becomes possible. Thus, the present invention is very profitable, and is capable of offering a camera with both photographic modes that is simple in the handling and the composition.

What is claimed is:

1. A camera which can select a shutter time priority photographing mode or an aperture priority photographing mode and can exchange its lenses, comprising:
   a. shutter means;
   b. shutter time setting means which can be set manually for generating an electrical signal corresponding to the set shutter time;
   c. shutter control means which is electrically connected to the shutter time setting means for generating signal to control the operation of the shutter means;
   d. aperture means having an aperture and aperture presetting means for determining the opening of the aperture;
   e. means for measuring the light transmitted through a photographing lens of fully open aperture, wherein said means generates an electrical signal corresponding to the light transmitted through the photographing lens;
   f. aperture value setting means which can be set independently of the shutter time setting means and has a transducing means for generating an electrical signal corresponding to an aperture value;
   g. aperture control means which is electrically connected to the aperture value setting means for generating a signal to control the operation of the aperture means;
   h. proper exposure amount detecting circuit means selectively and electrically connected either with the shutter time setting means or the aperture value setting means, wherein said means can be selectively connected either with the shutter control means or the aperture control means for producing a combination information output signal of the shutter value and the aperture value for giving a proper exposure in accordance with the light measuring means; and
   i. photographic mode effecting means which is electrically connected to the shutter control means and the aperture control means and is arranged to effectuate a setting value set through said shutter time setting means or said aperture value setting means according to a photographic mode selecting action performed.

2. A camera system according to claim 1, wherein the proper exposure amount detecting circuit means further includes an operation circuit means for setting additional photographic parameters than the shutter time information and the aperture value information and being connected to the light measuring circuit for producing combined information of the shutter time and the aperture value for obtaining the proper exposure amount.

3. A camera system in accordance with claim 1, wherein the photographic mode effecting means comprises at least one selecting means connectable with the shutter control means and the aperture control means, said selecting means selectively connecting either the shutter time setting operation input means to the shutter control means or the aperture value setting operation input means to the aperture control means.

4. A camera system according to claim 1, wherein the shutter control means and the aperture control means respectively comprise an operational device means connected respectively and functionally to the shutter time setting operation input means and to the aperture value setting operation input means for producing respectively the shutter time information and the aperture value information for obtaining the proper exposure.

5. A camera system according to claim 4, wherein the proper exposure amount detecting means further comprises a memory means connected to the output terminal of the operation circuit.

6. A camera system according to claim 5, wherein the memory means is a condenser.

7. A camera system according to claim 5, wherein the memory means is a digital counter.

8. A camera system according to claim 4, wherein the effecting means includes at least a selecting switch being selectively connected to the output terminal of the operation means or to the shutter time setting means and the aperture value setting means, whereby in accordance with the selected priority mode the value set on the shutter time setting means or the aperture value setting means with priority and the output value of the operation means are selectively connected to either the shutter control means or the aperture control means.

9. A camera system comprising:
   a camera having:
      a. a shutter,
      b. shutter control means functionally connected with the above mentioned shutter for controlling the opening time of the above mentioned shutter means,
      c. aperture means for controlling the exposure amount in cooperation with the above mentioned shutter means,
      d. aperture control means having an input for receiving an electrical signal corresponding to said aperture means setting value for providing aperture setting values to said aperture means,
      e. shutter time setting operation input means having a transducing means for forming an electrical signal corresponding to a setting value functionally engageable with the shutter control means for controlling the above mentioned shutter means during the opening time corresponding to the set operation value, f. proper exposure amount detecting means selectively connectable either with the shutter control means or the aperture control means for producing a combination information output of the shutter time and the aperture value for providing a proper exposure in accordance with the brightness of the object to be photographed; and g. an accessory unit selectively disengageable with the camera body, and, h. aperture value setting operation input means having another transducing means for forming an electrical signal corresponding to an aperture setting value, said accessory unit being provided with manually operable control means for setting an aperture independently of said shutter time setting operation input means, i. coupling means for operatively connecting said aperture value setting input means with said input of aperture control means, j. photographic mode effecting means selectively effectuating with either one of the shutter control means for the aperture control means so as to effectuate the input set value from the setting input means, whereby the photographic mode due to the selective setting operation by means of the photographic mode selecting means is effectuated by means of the photographic mode effecting means so as to make the photography with the selected mode possible.

10. A camera system according to claim 9, wherein the proper exposure amount detecting means further includes:

a. a light measuring circuit providing a light transducing means for receiving the light from the object to be photographed, and b. operation circuit means for setting other set photographic information that the shutter time information and the aperture value information and being connected to the above-mentioned light measuring unit so as to produce a combination information of the shutter time and the aperture value for obtaining the proper exposure amount.

11. A camera system in accordance with claim 9, wherein the mode effectuating means comprises at least one selecting means connectable to the shutter control means and the aperture control means, said selecting means selectively connecting the shutter time setting operation input means to the shutter control means or the aperture value setting operation input means to the aperture control means.

12. A camera system according to claim 9, wherein the shutter control means and the aperture control means respectively comprise an operation device means connected respectively and functionally to the shutter time setting operation input means and to the aperture value setting operation input means for producing respectively the shutter time information and the aperture value information for obtaining the proper exposure.

13. A camera system according to claim 9, wherein the proper exposure amount detecting means further comprises a memory means, said means being connected to the output terminal of the operation circuit.

14. A camera system according to claim 13, wherein the memory means is a condenser.

15. A camera system according to claim 13, wherein the memory means is a digital counter.

16. A camera system according to claim 12, wherein the effecting means comprises at least a selecting switch selectively connected to the output terminal of the abovementioned operation means or to the shutter time setting operation input means and the aperture value setting operation input means, whereby in accordance with the selected priority mode the value set by the shutter time setting operation input means or the aperture value setting operation input means with priority and the output value of the operation means are selectively connected to either the shutter control means or the aperture control means.

17. A camera system comprising:

(A) aperture value setting means which is attachable to and detachable from a camera body, said means having transducing means which produces an electrical signal; and (B) a camera body which permits attachment thereto and detachment therefrom of said aperture value setting means, said camera body having:

a. shutter means;

b. shutter time setting means which can be set manually for generating an electrical signal corresponding to the set shutter time;

c. shutter control means which is electrically connected to the shutter time setting means for generating a signal to control operation of said shutter means;

d. aperture means having an aperture and aperture presetting means for determining the opening of the aperture;

e. means measuring the light transmitted through a photographing lens of fully open aperture, wherein said means generates an electrical signal corresponding to the light transmitted through the photographing lens;

f. memory means which receives information of the brightness of an object to be photographed obtained through said photographing lens when the aperture of said lens is fully open, said memory means being arranged to store exposure information corresponding to said brightness information;

g. an aperture value operation circuit which receives output signals of said memory means and said shutter time setting means to compute and produce aperture value information based upon said brightness information;

h. a shutter time value operation circuit arranged to compute and produce a shutter time value based upon the output of said memory means and information on manual aperture setting received from said aperture value setting means;

i. aperture control means which is electrically connected to the aperture value setting means and to the aperture value operation circuit to control said aperture means;

j. exposure information selecting means which supplies the aperture control means selectively with either the signal of the aperture value operation circuit or that of the aperture value setting means, said selecting means being arranged also to supply the shutter control means selectively with either the output signal of the shutter time value operation circuit or that of the shutter time setting means; and k. photographing mode changeover means operatively connected to said exposure information selecting means to selectively control the supply of a signal to said aperture control means or to said shutter control means in accordance with a photographic mode selected.

18. A camera according to claim 17, wherein said aperture value setting means includes a dial.

19. A camera system comprising:
    (A) manual aperture value setting means attachable to and detachable from a camera body, including:
        i. first aperture value setting means provided with a transducing means which produces an electrical signal corresponding to a first aperture setting value; and
        ii. second aperture value setting means provided with a transducing means which produces an electrical signal corresponding to a second aperture setting value; and
    (B) said camera body which permits attachment thereto and detachment therefrom of said manual aperture value setting means, said camera body having:
        a. shutter means;
        b. shutter time setting means which is manually settable and generates an electrical signal corresponding to the set shutter time;
        c. shutter control means which is electrically connected to the shutter time setting means and generates a signal to control the operation of the shutter means;
        d. aperture means having an aperture and an aperture presetting means for determining the opening of the aperture;
        e. means for measuring the light transmitted through a photographing lens of fully open aperture, wherein said means generates an electrical signal corresponding to the light transmitted through the photographing lens;
        f. memory means which receives information of the brightness of an object to be photographed obtained through the photographing lens when the aperture of said lens is fully open, said memory means being arranged to store exposure information corresponding to said brightness information;
        g. an aperture value operation circuit which receives output signals of said memory means and said shutter time setting means to compute and produce aperture value information based upon said brightness information;
        h. aperture control means which cooperates with the shutter means to control an exposure amount and has a logic circuit, said logic circuit receiving outputs of said manually aperture value setting means and the output of said aperture value operation circuit to produce a control signal for said aperture means;
        i. shutter time correction value operation means which computes a shutter time correction value based upon an output signal of the aperture value operation circuit and that of said manual aperture value setting means and which produces information based on the correction value thus computed; and
        j. shutter time value operation means which is connected to said shutter time control means and receives a signal of said shutter time setting means and that of said shutter time correction value operation means to perform correction of and control over a shutter time value on the basis of the shutter time correction value information.

20. A photographic camera, comprising:
    a. shutter means;
    b. shutter time setting means which is manually settable and generates an electrical signal corresponding to the set shutter time;
    c. shutter control means which is electrically connected to the shutter time setting means and generates signals of operation control of the shutter means;
    d. aperture means having an aperture and an aperture presetting means for determining the opening of the aperture;
    e. means for measuring the light transmitted through a photographing lens of fully open diaphragm, wherein said means generates an electrical signal corresponding to the light transmitted through the photographing lens;
    f. aperture value operation circuit means which receives information of the brightness of an object to be photographed and the output signal of said shutter time setting means to compute an aperture value based upon the brightness information and which produces information based upon the aperture value thus computed;
    g. aperture value setting means which can be set independently of said shutter time setting means, said aperture value setting means being provided with at least one transducing means for generating a mechanical signal corresponding to a setting value and with an output terminal;
    h. aperture control means having:
        i. engaging means arranged to be capable of engaging with said aperture means and to move in response to a start-up action of the camera;
        ii. transducing means which produces an electrical signal corresponding to the extent to which said engaging means moves; and
        iii. control means for controlling the movement and the stopping action of said engaging means, said control means being arranged to receive an output signal of each of said aperture value setting means, said transducing means of said aperture control means and said aperture value operation circuit means to perform a logical control, by which said aperture presetting means is controlled either to have a value corresponding to the output signal of the aperture value operation circuit means or to have a value corresponding to the setting value set by the aperture value setting means;
    i. shutter time correction value operating means which receives an output signal of said transducing means of said aperture control means and that of said aperture value operation circuit means to compute a shutter time information correction value based on the difference between said two output signals and to produce information on said correction value; and
    j. shutter time value operation means connected to said shutter control means, said shutter time value operation means being arranged to receive an output signal of said shutter time setting means and that of said shutter time correction value operation means to compute a shutter time value based upon said correction value information and to produce information based upon the shutter time value thus computed.

21. A photographic camera according to claim 19, wherein said aperture value setting means is arranged to be attachable to and detachable from a camera body.

* * * * *

UNITED STATES PATENT OFFICE
CERTIFICATE OF CORRECTION

Patent No. 4,165,929  Dated August 28, 1979

Inventor(s) Fumio Ito et al

It is certified that error appears in the above-identified patent and that said Letters Patent are hereby corrected as shown below:

In the heading of the patent, under [63], insert the following:

--[63] Continuation of Ser. No. 633,713, November 20, 1975, abandoned.--

Signed and Sealed this

First Day of January 1980

[SEAL]

*Attest:*

SIDNEY A. DIAMOND

*Attesting Officer*  *Commissioner of Patents and Trademarks*